United States Patent
Hong (10) Patent No.: US 11,647,437 B2
(45) Date of Patent: *May 9, 2023

(54) METHOD AND SYSTEM FOR BASE STATION HANDOVER

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/447,423

(22) Filed: Sep. 11, 2021

(65) Prior Publication Data

US 2021/0410032 A1 Dec. 30, 2021

Related U.S. Application Data

(63) Continuation of application No. 16/641,310, filed as application No. PCT/CN2017/099327 on Aug. 28, 2017, now Pat. No. 11,147,003.

(51) Int. Cl.
*H04W 4/00* (2018.01)
*H04W 36/08* (2009.01)
(Continued)

(52) U.S. Cl.
CPC ....... *H04W 36/08* (2013.01); *H04W 36/0058* (2018.08); *H04W 36/30* (2013.01);
(Continued)

(58) Field of Classification Search
CPC . H04W 36/08; H04W 36/0058; H04W 36/30; H04W 36/32; H04W 76/11;
(Continued)

(56) References Cited

U.S. PATENT DOCUMENTS 6,804,526 B1 * 10/2004 Yarkosky ............ H04M 3/4872
455/414.3
7,203,494 B2 * 4/2007 Flondro .......... H04W 36/00837
455/452.2
(Continued)

FOREIGN PATENT DOCUMENTS

CN 101472340 A 7/2009
CN 101834644 A 9/2010
(Continued)

OTHER PUBLICATIONS

International search report of PCT application No. PCT/CN2017/099327 dated Jan. 29, 2018.
(Continued)

*Primary Examiner* — Amancio Gonzalez
(74) *Attorney, Agent, or Firm* — Syncoda LLC; Feng Ma (57) ABSTRACT

A method for base station handover includes: receiving a Handover Request message sent by a mobility management entity (MME)), to which a destination base station is connected, via an S1 interface, wherein the Handover Request message carries UE excessively high-temperature indication information; sending a Handover Request Acknowledge message to the MME via the S1 interface, so that the MME sends a Handover Command message to a source base station of the UE; and setting transmission configuration information for the UE based on the UE excessively high-temperature indication information, wherein a data transmission rate corresponding to the set transmission configuration information is lower than a maximum data transmission rate that the destination base station can provide for the UE.

18 Claims, 6 Drawing Sheets

(51) Int. Cl.
*H04W 76/11* (2018.01)
*H04W 76/27* (2018.01)
*H04W 36/00* (2009.01)
*H04W 36/30* (2009.01)
*H04W 36/32* (2009.01)

(52) U.S. Cl.
CPC ............ *H04W 36/32* (2013.01); *H04W 76/11* (2018.02); *H04W 76/27* (2018.02)

(58) Field of Classification Search
CPC ............ H04W 76/27; H04W 52/0251; H04W 36/00835; H04W 36/0083; H04W 76/10; Y02D 30/70
USPC .......................................................... 370/331
See application file for complete search history.

(56) References Cited

U.S. PATENT DOCUMENTS

| | | | | |
|---|---|---|---|---|
| 7,565,106 | B1* | 7/2009 | Oh | H04B 7/155 455/7 |
| 8,538,325 | B2* | 9/2013 | Gunnarsson | H04W 24/00 455/7 |
| 10,080,173 | B1* | 9/2018 | Rai | H04L 43/08 |
| 10,819,238 | B1* | 10/2020 | King | H02M 3/1584 |
| 11,147,003 | B2* | 10/2021 | Hong | H04W 36/08 |
| 2008/0296512 | A1 | 12/2008 | Caine et al. | |
| 2010/0273517 | A1* | 10/2010 | Pinheiro | H04B 1/036 455/522 |
| 2016/0262143 | A1* | 9/2016 | Breuer | H04W 76/20 |

FOREIGN PATENT DOCUMENTS

| | | |
|---|---|---|
| CN | 101938819 A | 1/2011 |
| CN | 102017493 A | 4/2011 |
| CN | 102119490 A | 7/2011 |
| CN | 102123462 A | 7/2011 |
| CN | 102918912 A | 2/2013 |
| CN | 105578416 A | 5/2016 |
| CN | 106453948 A | 2/2017 |

OTHER PUBLICATIONS

First office action of Chinese application No. 201780000907.X dated May 15, 2020.
Notice of allowance of U.S. Appl. No. 16/641,310 dated Jun. 21, 2021.

* cited by examiner

METHOD AND SYSTEM FOR BASE STATION HANDOVER

CROSS-REFERENCE TO RELATED APPLICATIONS

This is a continuation of U.S. patent application Ser. No. 16/641,310 filed on Feb. 24, 2020, which is a national stage of International Application No. PCT/CN2017/099327 filed on Aug. 28, 2017. The disclosures of these applications are hereby incorporated by reference in their entirety.

BACKGROUND

With the development of the mobile communication technology, when UE (User Equipment) plays on-line videos and carries out certain service processing requiring a high data transmission rate in an LTE (Long Term Evolution) network, a base station may configure a high-level MIMO (Multiple-Input Multiple-Output) mode, a multi-carrier aggregation mode, or a high-level modulation coding mode for the UE, so as to obtain the high data transmission rate.

SUMMARY

The present disclosure relates generally to the field of communication technology, and more specifically to a method, an apparatus and a system for base station handover.

Various embodiments of the present disclosure provide a method, an apparatus and a system for base station handover.

According to a first aspect of the embodiments of the present disclosure, there is provided a method for base station handover, comprising:

receiving a Handover Request message sent by a mobility management entity (MME), to which the destination base station is connected, via an S1 interface, wherein the Handover Request message carries UE excessively high-temperature indication information;

sending a Handover Request Acknowledge message to the MME via the S1 interface, so that the MME sends a Handover Command message to a source base station of the UE;

setting transmission configuration information for the UE based on the UE excessively high-temperature indication information after receiving a random-access request sent by the UE, wherein a data transmission rate corresponding to the set transmission configuration information is lower than a maximum data transmission rate that the destination base station can provide for the UE; and sending service data to the UE based on the set transmission configuration information.

Optionally, the excessively high-temperature indication information is expected transmission configuration information and/or an excessively high-temperature indication identifier of the UE, wherein the expected transmission configuration information comprises a number of antennas, and/or a modulation coding mode, and/or a number of aggregated carriers; and the setting transmission configuration information for the UE based on the UE excessively high-temperature indication information comprises:

setting the transmission configuration information of the UE to the expected transmission configuration information.

Thus, the temperature of the UE can be reduced.

Optionally, the setting transmission configuration information for the UE comprises:

reducing a number of antennas in the transmission configuration information of the UE, and/or setting a modulation coding mode in the transmission configuration information of the UE to a low-level modulation coding mode, and/or reducing a number of aggregated carriers in the transmission configuration information of the UE.

Thus, the temperature of the UE can be reduced

Optionally, the method further comprises:

resetting the transmission configuration information for the UE upon receiving normal-temperature indication information sent by the UE, wherein a data transmission rate corresponding to the reset transmission configuration information is higher than a data transmission rate corresponding to the transmission configuration information of the UE when receiving the normal-temperature indication information sent by the UE.

Thus, user experience can be improved.

Optionally, the method further comprises:

sending an S1 Setup Request message to the MME when the destination base station establishes a connection with the MME, wherein the S1 Setup Request message carries an indication identifier, which is configured to indicate that the destination base station may reduce the temperature of the UE by setting the transmission configuration information for the UE; and receiving an S1 Setup Response message sent by the MME.

Thus, transmission resources can be saved.

According to a second aspect of the embodiments of the present disclosure, there is provided a method for base station handover, comprising:

receiving a measurement report and UE excessively high-temperature indication information sent by the UE;

determining a destination base station for the base station handover of the UE based on the measurement report;

sending a Handover Require message to a mobility management entity (MME), to which the source base station is connected, via an S1 interface, so that the MME sends a Handover Request message to the destination base station, wherein both the Handover Require message and the Handover Request message carry the UE excessively high-temperature indication information; and sending a radio resource control (RRC) connection reconfiguration message to the UE upon receiving a Handover Command message sent by the MME via the S1 interface.

Optionally, the excessively high-temperature indication information is expected transmission configuration information and/or an excessively high-temperature indication identifier of the UE, wherein the expected transmission configuration information comprises a number of antennas, and/or a modulation coding mode, and/or a number of aggregated carriers.

According to a third aspect of the embodiments of the present disclosure, there is provided a method for base station handover, comprising:

sending a measurement report and UE excessively high-temperature indication information to a connected source base station upon detecting that a base station handover condition is met, when the temperature of the UE is greater than or equal to a preset value;

sending a random-access request to a destination base station upon receiving a radio resource control (RRC) connection reconfiguration message sent by the source base station, so that the destination base station sets transmission configuration information; and receiving service data sent by the destination base station.

Optionally, the method further comprises:

sending normal-temperature indication information to the destination base station upon detecting that the temperature of the UE is lower than the preset value.

Optionally, the sending normal-temperature indication information to the destination base station upon detecting that the temperature of UE is lower than the preset value, comprises:

sending normal-temperature indication information to the destination base station upon detecting that the temperature of the UE is lower than the preset value for a preset duration.

According to a fourth aspect of the embodiments of the present disclosure, there is provided a base station, comprising:

a receiving module, which is configured to receive a Handover Request message sent by a mobility management entity (MME), to which the destination base station is connected, via an S1 interface, wherein the Handover Request message carries UE excessively high-temperature indication information;

a sending module, which is configured to send a Handover Request Acknowledge message to the MME via the S1 interface, so that the MME sends a Handover Command message to a source base station of the UE;

a setting module, which is configured to set transmission configuration information for the UE based on the UE excessively high-temperature indication information after receiving a random-access request sent by the UE, wherein a data transmission rate corresponding to the set transmission configuration information is lower than a maximum data transmission rate that the destination base station can provide for the UE, wherein the sending module is further configured to send service data to the UE based on the set transmission configuration information.

Optionally, the excessively high-temperature indication information is expected transmission configuration information and/or an excessively high-temperature indication identifier of the UE, wherein the expected transmission configuration information comprises a number of antennas, and/or a modulation coding mode, and/or a number of aggregated carriers; and the setting module is configured to:

set the transmission configuration information of the UE to the expected transmission configuration information.

Optionally, the setting module is configured to:

reduce a number of antennas in the transmission configuration information of the UE, and/or set a modulation coding mode in the transmission configuration information of the UE to a low-level modulation coding mode, and/or reduce a number of aggregated carriers in the transmission configuration information of the UE.

Optionally, the setting module is further configured to:

reset the transmission configuration information for the UE upon receiving normal-temperature indication information sent by the UE, wherein a data transmission rate corresponding to the reset transmission configuration information is higher than a data transmission rate corresponding to the transmission configuration information of the UE when receiving the normal-temperature indication information sent by the UE.

Optionally, the sending module is further configured to:

send an S1 Setup Request message to the MME when the destination base station establishes a connection with the MME, wherein the S1 Setup Request message carries an indication identifier, which is configured to indicate that the destination base station may reduce the temperature of the UE by setting the transmission configuration information for the UE; and the receiving module is further configured to receive an S1 Setup Response message sent by the MME.

According to a fifth aspect of the embodiments of the present disclosure, there is provided a base station, comprising:

a receiving module, which is configured to receive a measurement report and UE excessively high-temperature indication information sent by the UE;

a determining module, which is configured to determine a destination base station for the base station handover of the UE based on the measurement report;

a sending module, which is configured to send a Handover Require message to a mobility management entity (MME), to which the source base station is connected, via an S1 interface, so that the MME sends a Handover Request message to the destination base station, wherein both the Handover Require message and the Handover Request message carry the UE excessively high-temperature indication information, wherein the sending module is further configured to send a radio resource control (RRC) connection reconfiguration message to the UE upon receiving a Handover Command message sent by the MME via the S1 interface.

Optionally, the excessively high-temperature indication information is expected transmission configuration information and/or an excessively high-temperature indication identifier of the UE, wherein the expected transmission configuration information comprises a number of antennas, and/or a modulation coding mode, and/or a number of aggregated carriers.

According to a sixth aspect of the embodiments of the present disclosure, there is provided a user equipment (UE), comprising:

a sending module, which is configured to send a measurement report and UE excessively high-temperature indication information to a connected source base station upon detecting that a base station handover condition is met, when the temperature of the UE is greater than or equal to a preset value; wherein the sending module is further configured to send a random-access request to a destination base station upon receiving a radio resource control (RRC) connection reconfiguration message sent by the source base station, so that the destination base station sets transmission configuration information; and a receiving module, which is configured to receive service data sent by the destination base station.

Optionally, the sending module is further configured to:

send normal-temperature indication information to the destination base station upon detecting that the temperature of the UE is lower than the preset value.

Optionally, the sending module is further configured to:

send normal-temperature indication information to the destination base station upon detecting that the temperature of the UE is lower than the preset value for a preset duration.

According to a seventh aspect of the embodiments of the present disclosure, there is provided a computer readable storage medium, which stores at least one instruction, at least one program, a code set, or an instruction set, wherein the at least one instruction, the at least one program, the code set or the instruction set is loaded and executed by a processor to implement the method for base station handover according to the first aspect.

According to an eighth aspect of the embodiments of the present disclosure, there is provided a computer readable storage medium, which stores at least one instruction, at least one program, a code set, or an instruction set, wherein the at least one instruction, the at least one program, the code set or the instruction set is loaded and executed by a processor to implement the method for base station handover described in the second aspect.

According to a ninth aspect of the embodiments of the present disclosure, there is provided a computer readable storage medium, which stores at least one instruction, at least one program, a code set, or an instruction set, wherein the at least one instruction, the at least one program, the code set or the instruction set is loaded and executed by a processor to implement the method for base station handover described in the third aspect.

According to a tenth aspect of the embodiments of the present disclosure, there is provided a base station, comprising a processor and a memory, wherein the memory stores at least one instruction, at least one program, a code set, or an instruction set, wherein the at least one instruction, the at least one program, the code set or the instruction set is loaded and executed by the processor to implement the method for base station handover described in the first aspect.

According to an eleventh aspect of the embodiments of the present disclosure, there is provided a base station, comprising a processor and a memory, wherein the memory stores at least one instruction, at least one program, a code set, or an instruction set, wherein the at least one instruction, the at least one program, the code set or the instruction set is loaded and executed by the processor to implement the method for base station handover described in the second aspect.

According to a twelfth aspect of the embodiments of the present disclosure, there is provided a user equipment, comprising a processor and a memory, wherein the memory stores at least one instruction, at least one program, a code set, or an instruction set, wherein the at least one instruction, the at least one program, the code set or the instruction set is loaded and executed by the processor to implement the method for base station handover described in the third aspect.

According to a thirteenth aspect of an embodiment of the present disclosure, there is provided a system for base station handover, including a destination base station such as the base station described in the fourth aspect, a source base station such as the base station described in the fifth aspect, and user equipment such as the user equipment described in the sixth aspect.

The technical solutions provided by the embodiments of the present disclosure may include the following beneficial effects.

In an embodiment of the present disclosure, a Handover Request message sent by a mobility management entity (MME), to which a destination base station is connected, is received via an S1 interface, wherein the Handover Request message carries UE excessively high-temperature indication information; a Handover Request Acknowledge message is sent to the MME via the S1 interface, so that the MME sends a Handover Command message to a source base station of the UE; after receiving a random-access request sent by the UE, transmission configuration information is set for the UE based on the UE excessively high-temperature indication information, wherein a data transmission rate corresponding to the set transmission configuration information is lower than a maximum data transmission rate that the destination base station can provide for the UE; and service data is sent to the UE based on the transmission configuration information. As such, when the UE undergoes base station handover at an excessively high temperature, the destination base station may reduce the operating load of the CPU for the UE by setting the transmission configuration information of the UE, thereby reducing the temperature of the UE to reduce the possibility of service interruption.

BRIEF DESCRIPTION OF THE DRAWINGS

In order to describe the technical solutions in the embodiments of the present more clearly, the following briefly introduces the accompanying drawings required for describing the embodiments. Apparently, the accompanying drawings in the following description show merely some embodiments of the present disclosure, and a person of ordinary skill in the art may also derive other drawings from these accompanying drawings without creative efforts.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the disclosure as recited in the appended claims.

In a situation that the UE transmits data at a high data transmission rate for a long time, the operating load of an CPU (Central Processing Unit) of the UE may get high throughout the whole process to lead to excessively high temperature of the UE, resulting in service processing interruption and the like of the UE.

An exemplary embodiment of the present disclosure provides a method for base station handover. A shown in FIG. 1, the method for base station handover may be implemented by a source base station, a destination base station and a terminal jointly; the source base station is a base station which the UE accesses before the handover; and the destination base station is a base station which the UE is about to access.

Figure 1:
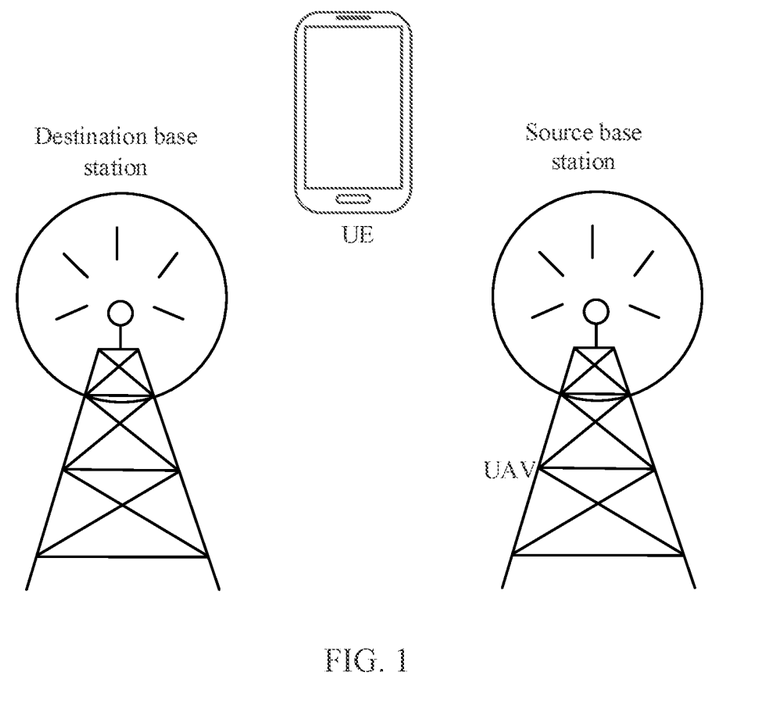
FIG. 1 is a schematic diagram of a system for base station handover according to an embodiment of the present disclosure.

The UE may be a mobile phone, a tablet computer and other devices capable of utilizing the mobile communication network. The terminal may be provided with a processor, a memory, a transceiver, etc. The processor may be configured to process a base station handover process; the memory may be configured to store data required and data produced during the base station handover; the transceiver may be configured to receive and transmit messages; and the terminal may be further provided with an input/output device such as a screen which may be configured to display signal quality and the like and may be a touch screen.

The source base station may be provided with a processor, a transceiver, a memory, etc. The processor may be configured for relevant processing during the base station handover; the transceiver may be configured to receive and transmit data; and the memory may be configured to store data required and data produced during the base station handover.

The destination base station may be provided with a processor, a transceiver, a memory, etc. The processor may be configured for relevant processing during the base station handover; the transceiver may be configured to receive and transmit data; and the memory may be configured to store data required and data produced during the base station handover.

Figure 2:
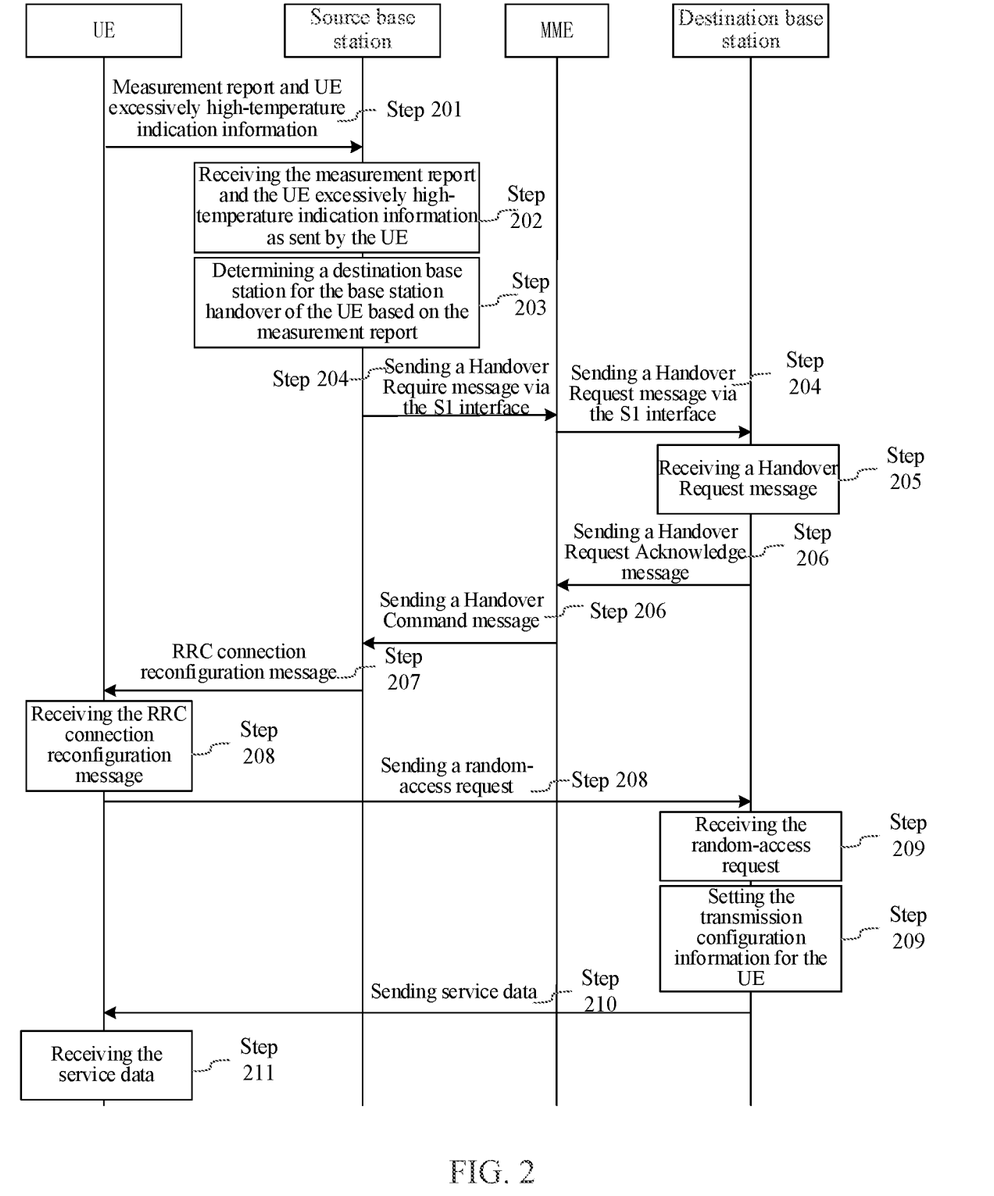
FIG. 2 is a schematic flowchart of a method for base station handover according to an embodiment of the present disclosure.

As shown in FIG. 2, a process flow of the method may include the following steps.

In step 201, when the temperature of the UE is greater than or equal to a preset value, the UE sends a measurement report and UE excessively high-temperature indication information to a connected source base station when detecting that a base station handover condition is satisfied.

Among them, the preset value may be set as 45 degrees and the like by a technician.

In an implementation, the UE may detect its own temperature periodically when in use; if the UE detects that its own temperature is greater than or equal to the preset value, the UE performs cell measurement to obtain the signal strength of a cell to which it belongs and the signal strength of a neighboring cell when receiving a cell measurement report instruction sent by a source base station or when a cell measurement period is reached. If a base station handover condition is satisfied (for example, the signal strength of the neighboring cell is higher than that of the current cell, and the neighboring cell belongs to the coverage of other base stations, etc.), the UE may send the measurement report and the UE excessively high-temperature indication information to the source base station, i.e., the base station which the UAV accesses currently, wherein the measurement report includes the measured signal strength of the cell.

Alternatively, the excessively high-temperature indication information is expected transmission configuration information and/or an excessively high-temperature indication identifier of the UE.

Among them, the excessively high-temperature indication identifier may be preset and pre-stored in the UE by the technician. For example, the identifier may be a string of numerals. The expected transmission configuration information is the transmission configuration information that the UE expects the base station to set for it; and a data transmission rate corresponding to the expected transmission configuration information is generally lower than a data transmission rate corresponding to the currently used transmission configuration information, and includes a number of antennas, and/or a modulation coding mode, and/or a number of aggregated carriers. For example, when the number of antennas is 6, the modulation coding mode is a high-level modulation coding mode and the number of aggregated carriers is 4 in the currently used transmission configuration information, the expected transmission configuration information includes the following: the number of antennas is 5, the modulation coding mode is a low-level modulation coding mode, the number of aggregated carriers is 2, etc.

In addition, the expected transmission configuration information may also be a UE type. For example, the actual type of the UE corresponds to the transmission configuration information of a high configuration. To reduce the temperature, the UE may send a UE type corresponding to the transmission configuration information of a low configuration to the base station, and thus, since the UE type provided by the UE corresponds to the transmission configuration information of the low configuration, the destination base station sets the transmission configuration information of the low configuration for the UE, thereby reducing the temperature of the UE.

In step 202, the source base station receives the measurement report and the UE excessively high-temperature indication information as sent by the UE.

In step 203, the source station determines a destination base station for the base station handover of the UE based on the measurement report.

In an implementation, after the source base station receives the measurement report and the UE excessively high-temperature indication information as sent by the UE, the destination base station for the base station handover of the UE may be determined by using the measurement report. For example, in the measurement report, when the signal strength of the neighboring cell of a source cell of the UE is higher than that of the source cell, and this condition lasts for a period of time, the source base station may determine that the base station to which the neighboring cell belongs is the destination base station for the base station handover of the UE.

In step 204, the source base station sends a Handover Require message to the MME, to which the source base station connected, via the S1 interface, so that the MME sends a Handover Request message to the destination base station.

In an implementation, after determining the destination base station for the base station handover, the source base station may determine an MME (Mobile Management Entity) connected thereto via the S1 interface, and then send a Handover Require message to the MME via the S1 interface, requesting the handover. After receiving the Handover Require message sent by the UE, the MME may determine whether the destination base station is connected thereto via the S1 interface by using the identifier of the destination base station as carried in the Handover Require message. If the destination base station is connected to the MME, the MME may determine that the destination base station and the source base station belong to the same MME; and the MME may send a Handover Request message to the destination base station, while carrying the identifier of the destination base station and the UE excessively high-temperature indication information in this message to request the handover for the UE. If the destination base station is not connected to the MME via the S1, the MME may determine that the destination base station and the source base station belong to different MMES; the MME may send a Forward Relocation Request message to the MME to which the destination base station belongs, while carrying the identifier of the destination base station and the UE excessively high-temperature indication information in this message; and after receiving the Forward Relocation Request message, the MME to which the destination base station belongs may determine the destination base station by using the identifier of the destination base station, and then send a Handover Request message to the destination base station via the S1 interface, while carrying the UE excessively high-temperature indication information in this message, requesting the handover for the UE.

In step 205, the destination base station receives a Handover Request message sent by the MME, to which the destination base station is connected, via the S1 interface.

In step 206, the destination bases station sends a Handover Request Acknowledge message to the MME via the S1 interface, so that the MME sends a Handover Command message to a source base station of the UE.

In an implementation, after receiving the Handover Request message sent by the MME, to which the destination base station is connected, via the S1 interface, the destination base station may determine whether the idle resources thereof are more than or equal to the resources required by the UE; and if the idle resources of the destination base station are more than or equal to the resources required by the UE, the destination base station may reserve the resources for the UE, and may send a Handover Request Acknowledge message to the MME via the S1 interface so as to acknowledge that the UE may access the destination base station. For example, there are 30M resources in the destination base station in total, with 10M allocated to other terminals and 5M required by the UE, and the resources are thus sufficient for the UE to use; and here, the destination base station may send a Handover Request Acknowledge message to the MME, to which it is connected, via the S1 interface.

After the MME to which the destination base station belongs receives the Handover Request Acknowledge message, if the source base station and the destination base station belong to the same MME, the MME to which the destination base is connected may directly send a Handover Command message to the source base station via the S1 interface, informing the source base station that the UE may perform the base station handover. When the source base station and the destination base station do not belong to the same MME, the MME to which the destination base station belongs may send a Forward Relocation Response message to the MME to which the source base station belongs; and after receiving the Forward Relocation Response message, the MME to which the source base station belongs may send a Handover Command message to the source base station via the S1 interface to inform the source base station that the UE may perform base station handover.

In step 207, when the Handover Command message sent by the MME is received via the S1 interface, the source base station sends an RRC connection reconfiguration message to the UE.

In an implementation, when receiving the Handover Command message via the S1 interface, the source base station determines that the UE may perform base station handover, and may send the RRC (Radio Resource Control) connection reconfiguration message to the UE.

In step 208, when the RRC connection reconfiguration message sent by the source base station is received, the UE sends a random-access request to the destination base station to establish an RRC connection with the destination base station.

In an implementation, when receiving the RRC connection reconfiguration message (which may carry an identifier of the destination base station) sent by the source base station, the UE may send the random-access request to the destination base station and send a preamble.

In step 209, after receiving the random-access request sent by the UE, transmission configuration information is set for the UE based on the UE excessively high-temperature indication information.

Among them, setting the transmission configuration information includes setting the number of antennas, the modulation coding mode, the number of aggregated carriers, etc.

In an implementation, when the destination base station receives the random-access request sent by the UE, the destination base station may send a random-access response to the UE; the UE sends an RRC connection Reconfiguration Complete message to the destination base station; and the destination base station establishes the RRC connection well with the UE after receiving this message.

After the destination base station establishes the RRC connection well with the UE, the destination base station may set the transmission configuration information for the UE by using the UE excessively high-temperature indication information, where the data transmission rate corresponding to the set transmission configuration information is lower than the maximum transmission rate that the destination base station can provide for the UE; and in this way, the UE receives the service data at low rate, so that the operating load of the CPU of the UE is reduced, thereby reducing the temperature of the UE.

In addition, the destination base station may also send a handover notify message to the connected MME via the S1 interface to notify the MME that the handover is completed. After receiving the handover notify message reported by the destination base station, the MME notifies the source base station to release context information related to the UE, and the source base station reports that the release is completed, thereby completing the handover here.

Alternatively, the setting of the transmission configuration information for the UE is to reduce the number of antennas in the transmission configuration information of the UE, and/or set the modulation coding mode in the transmission configuration information of the UE to a low-level modulation coding mode, and/or reduce the number of aggregated carriers in the transmission configuration information of the UE.

Among them, the transmission configuration information may be the number of antennas, the modulation coding mode, the number of aggregated carriers, etc.

In an implementation, the destination base station may determine the transmission configuration information that may be used currently by the UE. In general, the transmission configuration information that may be used by the UE corresponds to the UE type which may reflect the capability of the UE. The higher the capability of the UE, the higher configuration the transmission configuration information may be of; and the lower the capability of the UE, the lower configuration the transmission configuration information may be of. For example, the UE with higher capability may correspond to the MIMO, multi-carrier aggregation and the like at a high level; and the UE with lower capability may correspond to the modulation coding mode and the like at a low level.

After determining the transmission configuration information that may be used currently by the UE, the destination base station may reduce the number of antennas in the transmission configuration information of the UE, and/or set the modulation coding mode in the transmission configuration information of the UE to the low-level modulation coding mode, and/or reduce the number of aggregated carriers in the transmission configuration information of the UE, based on the transmission configuration information that may be used. For example, if the transmission configuration information that may be used currently is as follows: the number of antennas is 5, the number of aggregated carriers is 5 and the modulation coding mode is a high-level modulation coding mode, the transmission configuration information that is set for the UE is then as follows: the number of antennas is 4, the number of aggregated carriers is 2 and the modulation coding mode is a high-level modulation coding mode; or, the transmission configuration information that is set for the UE may be as follows: the number of antennas is 3, the number of aggregated carriers is 4 and the modulation coding mode is a low-level modulation coding mode, In addition, the technician sets preset transmission configuration information in the destination base station, and the preset transmission configuration information is set for the UE when the temperature of the UE is too high. When the temperature of the UE is too high, the destination base station may set the preset transmission configuration information for the UE.

Alternatively, the excessively high-temperature indication information is expected transmission configuration information and/or an excessively high-temperature indication identifier of the UE.

The transmission configuration information of the UE is set as the expected transmission configuration information.

Among them, the expected transmission configuration information is sent by the UE, and includes the number of antennas, and/or the modulation coding manner, and/or the number of aggregated carriers. For example, the number of antennas is 5, the modulation coding mode is a low-level modulation coding mode, the number of aggregated carriers is 2, etc.

In an implementation, after the destination base station establishes an RRC connection well with the UE, the destination base station may acquire the received expected transmission configuration information, and then set the transmission configuration information to the expected transmission configuration information. For example, if the number of antennas is 5 in the expected transmission configuration information, the transmission configuration information with the number of antennas being 5 may be set for the UE; and if the transmission configuration information is the low-level modulation coding mode in the expected transmission configuration information, the transmission configuration information with the modulation coding mode being the low-level modulation coding mode may be set for the UE.

In addition, the expected transmission configuration information may also be a UE type. For example, the actual type of the UE corresponds to the transmission configuration information of a high configuration. To reduce the temperature, the UE may send a UE type corresponding to the transmission configuration information of a low configuration to the base station, and thus, since the UE type provided by the UE corresponds to the transmission configuration information of the low configuration, the destination base station sets the transmission configuration information of the low configuration for the UE, thereby reducing the temperature of the UE.

In step 210, the destination base station sends service data to the UE based on the set transmission configuration information.

In an implementation, after setting the transmission configuration information, the destination base station may send service data to the UE. For example, a user watches a high-definition video currently using the UE, and the destination base station may receive the video data of this video sent by a server, and then send the video data corresponding to this video to the UE.

In step 211, the UE receives the service data sent by the destination base station.

In an implementation, the UE receives the service data sent by the destination base station, and processes the service data. For example, a user watches a high-definition video currently using the UE; and the UE may play the video data after receiving the video data sent by the destination base station; or the user caches a video currently using the UE, the UE may receive the video data sent by the destination base station, and then store the received video data.

Figure 3:
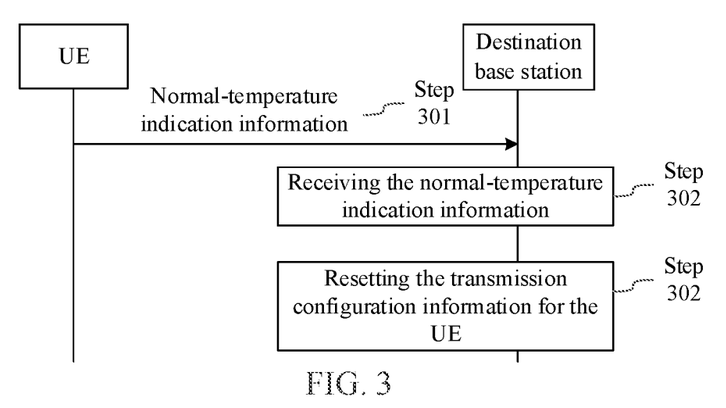
FIG. 3 is a schematic diagram of sending normal-temperature indication information according to an embodiment of the present disclosure.

Alternatively, as shown in FIG. 3, an embodiment of the present disclosure further provides that when the temperature of the UE is lower than the preset value after the base station handover is successful, a process flowchart of the UE and the destination may also be as follows.

In step 301, when detecting that the temperature of the UE is lower than the preset value, normal-temperature indication information is sent to the destination base station.

Among them, the preset value may be preset as 45 degrees and the like and then stored in the UE by a technician.

In an implementation, the UE may detect its own temperature periodically, and when detecting that the temperature decreases from a temperature higher than the preset value to a temperature lower than the preset value, the UE may send normal-temperature indication information to the destination base station. For example, with the preset value as 45 degrees, the UE may send a normal-temperature indication message to the destination base station after the temperature of the UE decreases from 55 degrees to 45 degrees.

Alternatively, the normal-temperature indication information may be sent to the destination base station after the temperature is lower than the present value for a period of time, and accordingly, Step 301 may include a process as follows:

when the temperature of the UE is detected to be lower than the preset value for a preset duration, sending the normal-temperature indication information to the destination base station.

Among them, the preset duration may be preset as 10 minutes and the like and then stored in the UE by a technician.

In an implementation, the UE may detect its own temperature periodically; when detecting that the temperature decreases from a temperature higher than the preset value to a temperature lower than the preset value, the UE may continue detecting its own temperature; and when the temperature is lower than the preset value for a preset duration, the UE sends normal-temperature indication information to the destination base station. For example, if the preset duration is 10 minutes and the preset value is 45 degrees, the UE may send a normal-temperature indication message to the destination base station when the temperature of the UE decreases from 55 degrees to a value below 45 degrees for a duration up to 10 minutes.

In step 302, the transmission configuration information is reset for the UE when the normal-temperature indication information sent by the UE is received.

In an implementation, when receiving the normal-temperature indication message sent by the UE, the destination base station may reset the transmission configuration information for the UE, i.e., by configuring high-level MIMO for the antennas, and/or increasing the number of aggregated carriers, and/or setting the modulation coding mode as a high-level modulation coding mode, etc. The data transmission rate corresponding to the reset transmission configuration information is higher than the data transmission rate corresponding to the transmission configuration information of the UE when the normal-temperature indication information sent by the UE is sued. As such, the UE may receive the service data more smoothly.

Figure 4:
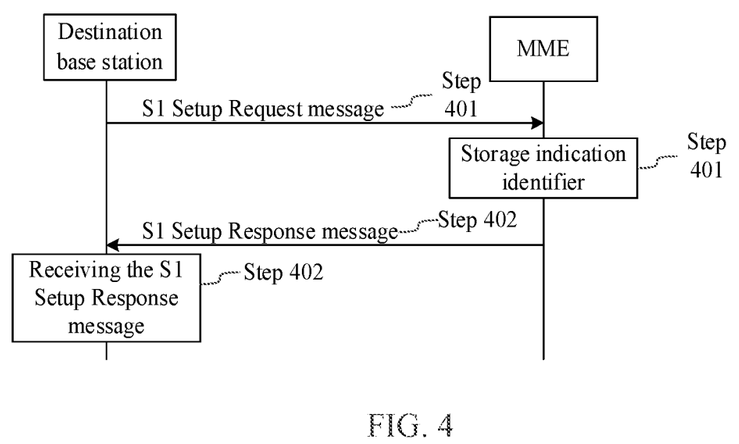
FIG. 4 is a schematic diagram of establishing an S1 connection between a base station and an MME according to an embodiment of the present disclosure.

Alternatively, an embodiment of the present disclosure further provides a process of establishing an S1 connection between the destination base station and the MME. As shown in FIG. 4, a corresponding process flow may be as follows.

In step 401, when the destination base station establishes a connection with the MME, an S1 Setup Request message is sent to the MME.

In an implementation, to establish an S1 connection with the MME, the destination base station may send an S1 Setup Request message with an indication identifier carried therein to the MME, wherein the indication identifier is configured to indicate that the destination base station may reduce the temperature of the UE by setting the transmission configuration information for the UE; and the indication identifier may be appointed in advance by the destination base station and the MME. After receiving the S1 Setup Request message sent by the destination base station, the MME may store the indication identifier.

Alternatively, the MME stores that the destination configuration base station may set the transmission configuration information for the UE to reduce the temperature of the UE. When the UE is to be handed over to the destination base station and the Handover Require message carries the UE excessively high-temperature indication information, if the destination base station may set the transmission configuration information for the UE to solve the problem that the temperature of the UE is too high, the MME may carry the UE excessively high-temperature indication information in the Handover Request message that is to be sent to the destination base station; and if the destination may not set the transmission configuration information for the UE to solve the problem that the temperature of the UE is too high, the MME may not carry the UE excessively high-temperature indication information in the Handover Request message that is to be sent to the destination base station, thereby saving transmission resources in such a way.

In step 402, the S1 Setup Response message sent by the MME is received.

In an implementation, if the MME agrees to establish an S1 connection with the destination base station, the MME may send an S1 Setup Response message to the destination base station, so that the destination base station establishes the S1 connection well with the MME, and subsequently may transmit messages using the S1 interface.

It should be noted that, when each base station establishes the S1 connection with the MME, if it is possible to set the transmission configuration information for the UE to solve the problem that the temperature of the UE is too high, each base station may carry an identifier indicating reducing the temperature of the UE by setting the transmission configuration information of the UE when sending the S1 Setup Request message. As such, the UE may determine which base stations may reduce the temperature of the UE by setting the transmission configuration information for the UE.

In an embodiment of the present disclosure, a Handover Request message sent by a mobility management entity (MME), to which a destination base station is connected, is received via an S1 interface, wherein the Handover Request message carries UE excessively high-temperature indication information; a Handover Request Acknowledge message is sent to the MME via the S1 interface, so that the MME sends a Handover Command message to a source base station of the UE; when receiving a random-access request sent by the UE, a radio resource control (RRC) connection is established with the UE, and transmission configuration information is set for the UE based on the UE excessively high-temperature indication information, wherein a data transmission rate corresponding to the set transmission configuration information is lower than a maximum data transmission rate that the destination base station can provide for the UE; and service data is sent to the UE based on the transmission configuration information. As such, when the UE undergoes base station handover at an excessively high temperature, the destination base station may reduce the operating load of the CPU for the UE by setting the transmission configuration information of the UE, thereby reducing the temperature of the UE to reduce the possibility of service interruption.

Figure 5:
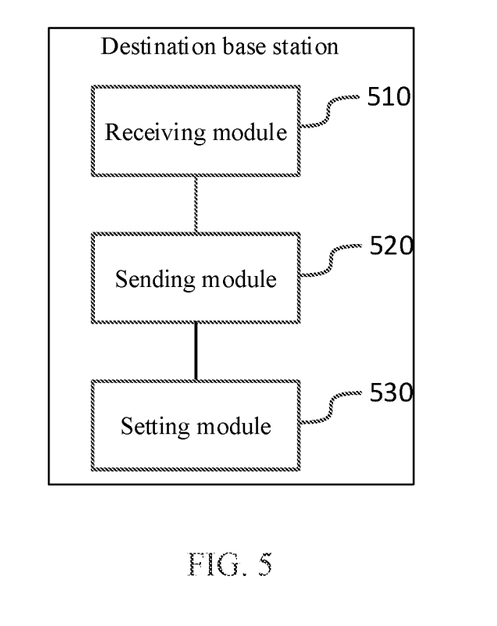
FIG. 5 is a schematic structural diagram of a base station according to an embodiment of the present disclosure.

Based on the same technical idea, another exemplary embodiment of the present disclosure provides a base station, as shown in FIG. 5, which includes:

a receiving module 510, which is configured to receive a Handover Request message sent by a mobility management entity (MME), to which a destination base station is connected, via an S1 interface, wherein the Handover Request message carries UE excessively high-temperature indication information;

a sending module 520, which is configured to send a Handover Request Acknowledge message to the MME via the S1 interface, so that the MME sends a Handover Command message to a source base station of the UE;

a setting module 530, which is configured to, after receiving a random-access request sent by the UE, set transmission configuration information for the UE based on the UE excessively high-temperature indication information, wherein a data transmission rate corresponding to the set transmission configuration information is lower than a maximum data transmission rate that the destination base station can provide for the UE, wherein the sending module 520 is further configured to send service data to the UE based on the set transmission configuration information.

Alternatively, the excessively high-temperature indication information is expected transmission configuration information and/or an excessively high-temperature indication identifier of the UE, wherein the expected transmission configuration information includes a number of antennas, and/or a modulation coding mode, and/or a number of aggregated carriers.

The setting module 530 is configured to:

set the transmission configuration information of the UE to the expected transmission configuration information.

Alternatively, the setting module 530 is configured to:

reduce the number of antennas in the transmission configuration information of the UE, and/or set the modulation coding mode in the transmission configuration information of the UE to a low-level modulation coding mode, and/or reduce the number of aggregated carriers in the transmission configuration information of the UE.

Alternatively, the setting module 530 is further configured to:

when normal-temperature indication information sent by the UE is received, reset the transmission configuration information for the UE, wherein a data transmission rate corresponding to the reset transmission configuration information is higher than a data transmission rate corresponding to the transmission configuration information of the UE when receiving the normal-temperature indication information sent by the UE.

Alternatively, the sending module 520 is further configured to:

when the destination base station establishes a connection with the MME, send an S1 Setup Request message to the MME, wherein the S1 Setup Request message carries an indication identifier, which is configured to indicate that the destination base station may reduce the temperature of the UE by setting the transmission configuration information for the UE.

The receiving module 510 is further configured to receive an S1 Setup Response message sent by the MME.

In an embodiment of the present disclosure, a Handover Request message sent by a mobility management entity (MME), to which a destination base station is connected, is received via an S1 interface, wherein the Handover Request message carries UE excessively high-temperature indication information; a Handover Request Acknowledge message is sent to the MME via the S1 interface, so that the MME sends a Handover Command message to a source base station of the UE; after receiving a random-access request sent by the UE, transmission configuration information is set for the UE based on the UE excessively high-temperature indication information, wherein a data transmission rate corresponding to the set transmission configuration information is lower than a maximum data transmission rate that the destination base station can provide for the UE; and service data is sent to the UE based on the transmission configuration information. As such, when the UE undergoes base station handover at an excessively high temperature, the destination base station may reduce the operating load of the CPU for the UE by setting the transmission configuration information of the UE, thereby reducing the temperature of the UE to reduce the possibility of service interruption.

It should be noted that when the base stations provided in the foregoing embodiment are subject to the base station handover, the division of each functional module above is merely for an exemplary and illustrative purpose; and in actual disclosures, the functions above may be assigned to and completed by different functional modules as required, that is, the internal structure of the base station is divided into different functional modules to complete all or some of the functions described above. In addition, the base stations provided in the foregoing embodiments and the method embodiments of the base station handover belong to the same technical idea, and a reference may be made to the method embodiments for the specific implementation process, which will not be repeated in detail herein.

Figure 6:
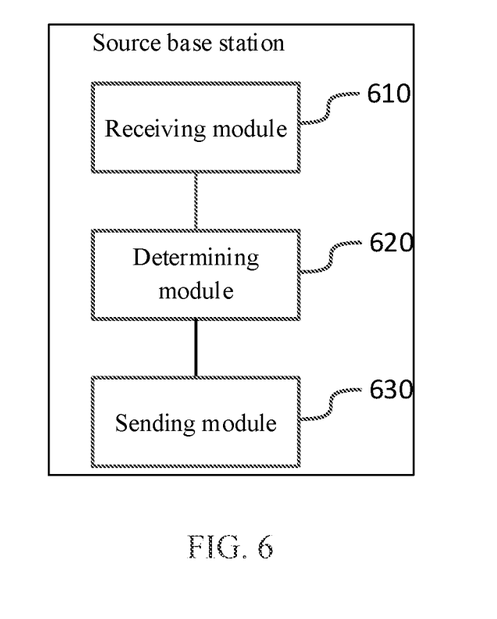
FIG. 6 is a schematic structural diagram of a base station according to another embodiment of the present disclosure.

Based on the same technical idea, another exemplary embodiment of the present disclosure provides a base station, as shown in FIG. 6, which includes:

a receiving module 610, which is configured to receive a measurement report and UE excessively high-temperature indication information sent by the UE;

a determining module, which is configured to determine a destination base station for the base station handover of the UE based on the measurement report;

a sending module 630, which is configured to send a Handover Require message to a mobility management entity (MME), to which a source base station is connected, via an S1 interface, so that the MME sends a Handover Request message to the destination base station, wherein both the Handover Require message and the Handover Request message carry the UE excessively high-temperature indication information, wherein the sending module 630 is further configured to, when receiving a Handover Command message sent by the MME via the S1 interface, send a radio resource control (RRC) connection reconfiguration message to the UE.

Alternatively, the excessively high-temperature indication information is expected transmission configuration information and/or an excessively high-temperature indication identifier of the UE, wherein the expected transmission configuration information includes a number of antennas, and/or a modulation coding mode, and/or a number of aggregated carriers.

In an embodiment of the present disclosure, a Handover Request message sent by a mobility management entity (MME), to which a destination base station is connected, is received via an S1 interface, wherein the Handover Request message carries UE excessively high-temperature indication information; a Handover Request Acknowledge message is sent to the MME via the S1 interface, so that the MME sends a Handover Command message to a source base station of the UE; after receiving a random-access request sent by the UE, transmission configuration information is set for the UE based on the UE excessively high-temperature indication information, wherein a data transmission rate corresponding to the set transmission configuration information is lower than a maximum data transmission rate that the destination base station can provide for the UE; and service data is sent to the UE based on the transmission configuration information. As such, when the UE undergoes base station handover at an excessively high temperature, the destination base station may reduce the operating load of the CPU for the UE by setting the transmission configuration information of the UE, thereby reducing the temperature of the UE to reduce the possibility of service interruption.

It should be noted that when the base stations provided in the foregoing embodiment are subject to the base station handover, the division of each functional module above is merely for an exemplary and illustrative purpose; and in actual disclosures, the functions above may be assigned to and completed by different functional modules as required, that is, the internal structure of the base station is divided into different functional modules to complete all or some of the functions described above. In addition, the base stations provided in the foregoing embodiments and the method embodiments of the base station handover belong to the same technical idea, and a reference may be made to the method embodiments for the specific implementation process, which will not be repeated in detail herein.

Figure 7:
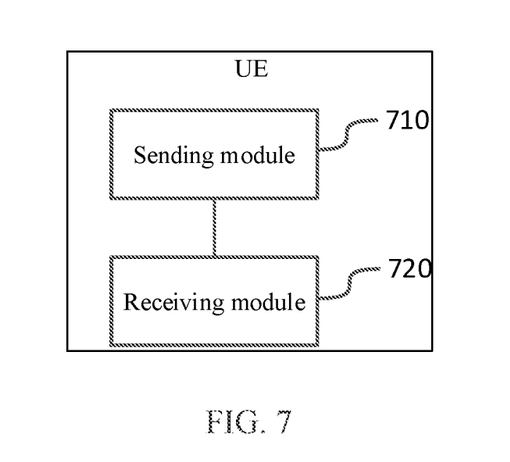
FIG. 7 is a schematic structural diagram of UE according to an embodiment of the present disclosure.

Based on the same technical idea, another exemplary embodiment of the present disclosure provides user equipment, as shown in FIG. 7, which includes:

a sending module 710, which is configured to, when the temperature of the UE is greater than or equal to a preset value, send a measurement report and UE excessively high-temperature indication information to a connected source base station when detecting that a base station handover condition is met, wherein the sending module 710 is further configured to, when a radio resource control (RRC) connection reconfiguration message sent by the source base station is received, send a random-access request to a destination base station, so that the destination base station sets transmission configuration information; and a receiving module 720, which is configured to receive service data sent by the destination base station.

Alternatively, the sending module 710 is further configured to:

when detecting that the temperature of the UE is lower than the preset value, send normal-temperature indication information to the destination base station.

Alternatively, the sending module 710 is further configured to:

when detecting that the temperature of the UE is lower than the preset value for a preset duration, send normal-temperature indication information to the destination base station.

In an embodiment of the present disclosure, a Handover Request message sent by a mobility management entity (MME), to which a destination base station is connected, is received via an S1 interface, wherein the Handover Request message carries UE excessively high-temperature indication information; a Handover Request Acknowledge message is sent to the MME via the S1 interface, so that the MME sends a Handover Command message to a source base station of the UE; after receiving a random-access request sent by the UE, transmission configuration information is set for the UE based on the UE excessively high-temperature indication information, wherein a data transmission rate corresponding to the set transmission configuration information is lower than a maximum data transmission rate that the destination base station can provide for the UE; and service data is sent to the UE based on the transmission configuration information. As such, when the UE undergoes base station handover at an excessively high temperature, the destination base station may reduce the operating load of the CPU for the UE by setting the transmission configuration information of the UE, thereby reducing the temperature of the UE to reduce the possibility of service interruption.

It should be noted that when the user equipment provided in the foregoing embodiment is subject to the base station handover, the division of each functional module above is merely for an exemplary and illustrative purpose; and in actual disclosures, the functions above may be assigned to and completed by different functional modules as required, that is, the internal structure of the user equipment is divided into different functional modules to complete all or some of the functions described above. In addition, the user equipment provided in the foregoing embodiments and the method embodiments of the base station handover belong to the same technical idea, and a reference may be made to the method embodiments for the specific implementation process, which will not be repeated in detail herein.

Figure 8:
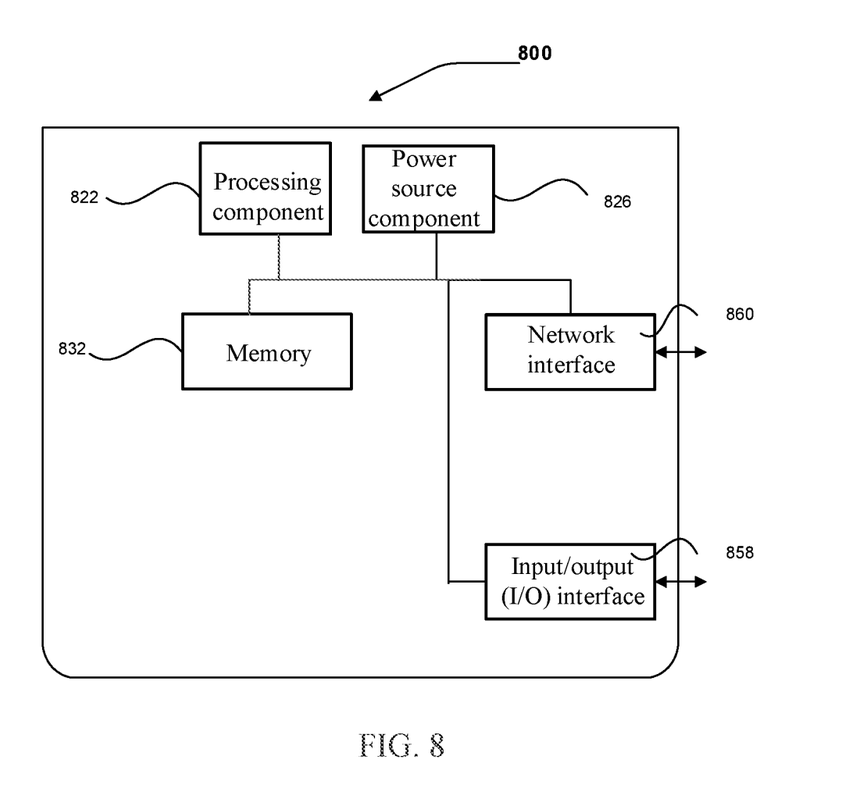
FIG. 8 is a schematic structural diagram of a base station according to another embodiment of the present disclosure.

A further exemplary embodiment of the present disclosure provides a schematic structural diagram of a base station. Referring to FIG. 8, a base station 800 includes a processing component 822 which further includes one or more processors, and memory resources represented by a memory 832 for storing instructions executable by the processing component 822, for example an disclosure program. The disclosure program stored in the memory 832 may include one or more than one module, each of which corresponds to a set of instructions. Further, the processing component 822 is configured to execute instructions to perform the above method as shown, used and recorded.

The base station 800 may also include a power source component 826 configured to perform power source management of the base station 800, a wired or wireless network interface 860 configured to connect the base station 800 to the network, and an input/output (I/O) interface 868. The base station 800 may operate an operating system stored in the memory 832, such as Windows Server™, Mac OS X™, Unix™, Linux™, FreeBSD™ or the like.

The base station 800 may include a memory, and one or more programs, wherein the one or more programs are stored in the memory, and configured to be executed by the one or more processors to execute the method for base station handover described above.

Figure 9:
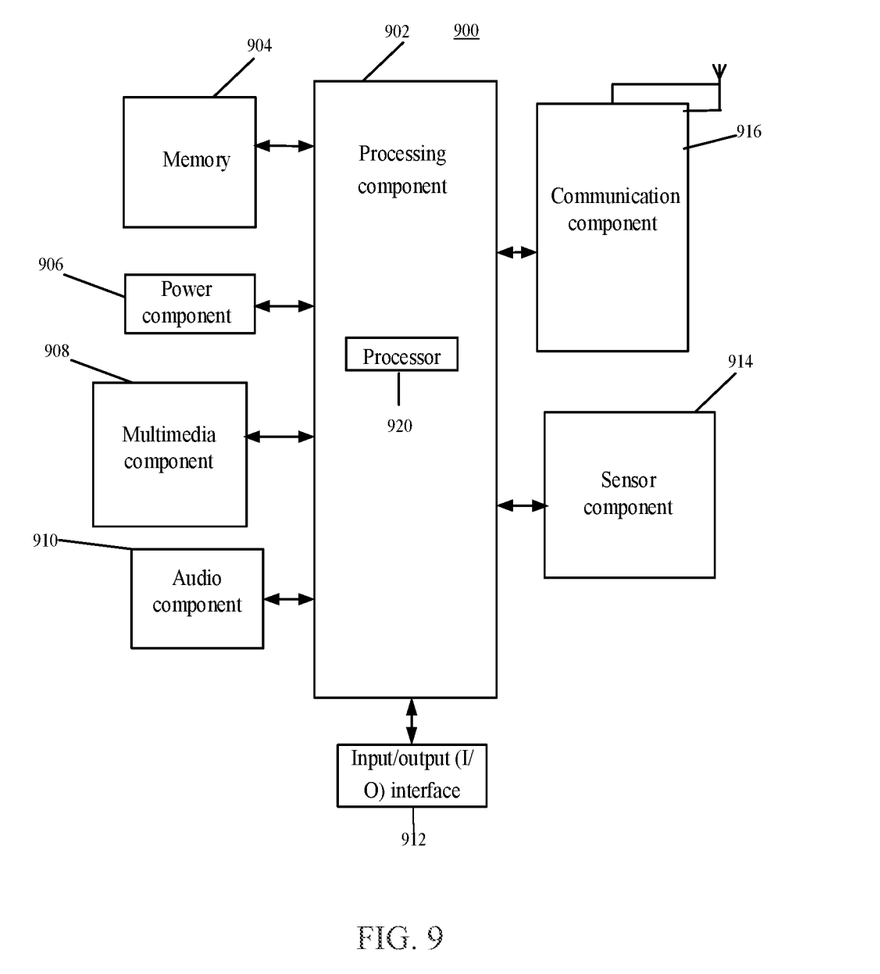
FIG. 9 is a schematic structural diagram of UE according to another embodiment of the present disclosure.

A further exemplary embodiment of the present disclosure provides a schematic structural diagram of the UE. This UE may be a mobile phone, a tablet computer, etc.

Referring to FIG. 9, the UE 900 may include one or more of the following components: a processing component 902, a memory 904, a power component 906, a multimedia component 908, an audio component 910, an input/output (I/O) interface 912, a sensor component 914, and a communication component 916.

The processing component 902 typically controls the overall operations of the UE 900, such as the operations associated with display, telephone calls, data communications, camera operations, and recording operations. The processing component 902 may include one or more processors 920 to execute instructions to perform all or part of the steps in the above-described methods. Moreover, the processing component 902 may include one or more modules which facilitate the interaction between the processing component 902 and other components. For instance, the processing component 902 may include a multimedia module to facilitate the interaction between the multimedia component 908 and the processing component 902.

The memory 904 is configured to store various types of data to support the operation of the UE 900. Examples of such data include instructions for any disclosures or methods operated on the UE 900, contact data, phonebook data, messages, pictures, videos, etc. The memory 904 may be implemented by using any type of volatile or non-volatile memory devices, or a combination thereof, such as a static random-access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 906 provides power to various components of the UE 900. The power component 906 may include a power management system, one or more power sources, and any other components associated with the generation, management, and distribution of power in the UE 900.

The multimedia component 908 includes a screen providing an output interface between the UE 900 and the user. In some embodiments, the screen may include a liquid crystal display (LCD) and a touch panel (TP). In some embodiments, an organic light-emitting diode (OLED) display can be employed.

If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense the duration and pressure associated with the touch or swipe action. In some embodiments, the multimedia component 908 includes a front camera and/or a rear camera. The front camera and the rear camera may receive external multimedia data while the UE 900 is in an operation mode, such as a photographing mode or a video mode. Each of the front camera and the rear camera may be a fixed optical lens system or have focus and optical zoom capability.

The audio component 910 is configured to output and/or input audio signals. For example, the audio component 910 includes a microphone (MIC) configured to receive external audio signals when the UE 900 is in an operation mode, such as a call mode, a recording mode, and a voice recognition mode. The received audio signal may be further stored in the memory 904 or transmitted via the communication component 916. In some embodiments, the audio component 910 further includes a speaker for outputting audio signals.

The I/O interface 912 provides an interface between the processing component 902 and peripheral interface modules, such as a keyboard, a click wheel, buttons, and the like. The buttons may include, but are not limited to, a home button, a volume button, a start button, and a lock button.

The sensor component 914 includes one or more sensors to provide status assessments of various aspects of the UE 900. For instance, the sensor component 914 may detect an on/off status of the UE 900, relative positioning of components, e.g., the display device and the mini keyboard of the UE 900, and the sensor component 914 may also detect a position change of the UE 900 or a component of the UE 900, presence or absence of user contact with the apparatus UE 900, orientation or acceleration/deceleration of the UE 900, and temperature change of the UE 900. The sensor component 914 may include a proximity sensor configured to detect the presence of nearby objects without any physical contact. The sensor component 914 may also include a light sensor, such as a CMOS or CCD image sensor, used for imaging disclosures. In some embodiments, the sensor component 914 may also include an accelerometer sensor, a gyroscope sensor, a magnetic sensor, a pressure sensor, or a temperature sensor.

The communication component 916 is configured to facilitate communication, wired or wirelessly, between the UE 900 and other devices. The UE 900 can access a wireless network based on a communication standard, such as Wi-Fi, 2G, or 3G, or a combination thereof. In an exemplary embodiment, the communication component 916 receives broadcast signals or broadcast associated information from an external broadcast management system via a broadcast channel. In an exemplary embodiment, the communication component 916 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the UE 900 may be implemented with one or more disclosure specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, a non-transitory computer-readable storage medium including instructions is also provided, such as the memory 904 including instructions, executable by the processor 920 in the UE 900, for performing the above-described methods. For example, the non-transitory computer-readable storage medium may be a ROM, a RAM, a CD-ROM, a magnetic tape, a floppy disc, an optical data storage device, and the like.

A further exemplary embodiment of the present disclosure provides a non-transitory computer readable storage medium. When an instruction in the storage medium is executed by a processor of a terminal, the UE is enabled to execute the method for base station handover as described above.

Those of ordinary skill in the art can understand that all or part of the steps described in the above embodiments can be completed through hardware, or through relevant hardware instructed by disclosures stored in a non-transitory computer readable storage medium, such as a read-only memory, a disk or a CD, etc.

The foregoing descriptions are merely preferred embodiments of the present disclosure, and are not intended to limit the present disclosure. Within the spirit and principles of the disclosure, any modifications, equivalent substitutions, improvements, etc., are within the protection scope of the present disclosure.

What is claimed is:

1. A method for base station handover, which is applied to a destination base station of user equipment (UE), the method comprising:
   receiving a Handover Request message sent by a mobility management entity (MME), to which the destination base station is connected, via an S1 interface, wherein the Handover Request message carries UE excessively high-temperature indication information;
   sending a Handover Request Acknowledge message to the MME via the S1 interface, so that the MME sends a Handover Command message to a source base station of the UE; and
   setting transmission configuration information for the UE based on the UE excessively high-temperature indication information, wherein a data transmission rate corresponding to the set transmission configuration information is lower than a maximum data transmission rate that the destination base station can provide for the UE.

2. The method according to claim 1, wherein the excessively high-temperature indication information comprises at least one of expected transmission configuration information and an excessively high-temperature indication identifier of the UE, wherein the expected transmission configuration information comprises at least one of a number of antennas, a modulation coding mode, and a number of aggregated carriers; and
   the setting transmission configuration information for the UE based on the UE excessively high-temperature indication information comprises:
   setting the transmission configuration information of the UE to the expected transmission configuration information.

3. The method according to claim 1, wherein the setting transmission configuration information for the UE comprises at least one of:
   reducing a number of antennas in the transmission configuration information of the UE,
   setting a modulation coding mode in the transmission configuration information of the UE to a low-level modulation coding mode, and
   reducing a number of aggregated carriers in the transmission configuration information of the UE.

4. The method according to claim 1, further comprising:
resetting the transmission configuration information for the UE upon receiving normal-temperature indication information sent by the UE, wherein a data transmission rate corresponding to the reset transmission configuration information is higher than a data transmission rate corresponding to the transmission configuration information of the UE when receiving the normal-temperature indication information sent by the UE.

5. The method according to claim 1, further comprising:
sending an S1 Setup Request message to the MME when the destination base station establishes a connection with the MME, wherein the S1 Setup Request message carries an indication identifier, which is configured to indicate that the destination base station may reduce the temperature of the UE by setting the transmission configuration information for the UE; and
receiving an S1 Setup Response message sent by the MME.

6. A method for base station handover, which is applied to user equipment (UE), the method comprising:
sending a measurement report and UE excessively high-temperature indication information to a connected source base station upon detecting that a base station handover condition is met, when the temperature of the UE is not less than a preset value; and
receiving a radio resource control (RRC) connection reconfiguration message sent by the source base station, so that the destination base station sets transmission configuration information.

7. The method according to claim 6, further comprising:
sending normal-temperature indication information to the destination base station upon detecting that the temperature of the UE is lower than the preset value.

8. The method according to claim 7, wherein the sending normal-temperature indication information to the destination base station upon detecting that the temperature of the UE is lower than the preset value, comprises:
sending normal-temperature indication information to the destination base station upon detecting that the temperature of the UE is lower than the preset value for a preset duration.

9. A base station, which is a destination base station of user equipment (UE), comprising a processor and memory, wherein the memory stores at least one instruction, at least one program, a code set, or an instruction set for execution by the processor to:
receive a Handover Request message sent by a mobility management entity (MME), to which a destination base station is connected, via an S1 interface, wherein the Handover Request message carries UE excessively high-temperature indication information;
send a Handover Request Acknowledge message to the MME via the S1 interface, so that the MME sends a Handover Command message to a source base station of the UE; and
set transmission configuration information for the UE based on the UE excessively high-temperature indication information, wherein a data transmission rate corresponding to the set transmission configuration information is lower than a maximum data transmission rate that the destination base station can provide for the UE.

10. The base station according to claim 9, wherein the excessively high-temperature indication information comprises at least one of expected transmission configuration information and an excessively high-temperature indication identifier of the UE wherein the expected transmission configuration information comprises at least one of a number of antennas, a modulation coding mode, and a number of aggregated carriers; and
the processor is further configured to:
set the transmission configuration information of the UE to the expected transmission configuration information.

11. The base station according to claim 9, wherein the processor is further configured to perform at least one of:
reducing a number of antennas in the transmission configuration information of the UE,
setting a modulation coding mode in the transmission configuration information of the UE to a low-level modulation coding mode, and
reducing a number of aggregated carriers in the transmission configuration information of the UE.

12. The base station according to claim 9, wherein the processor is further configured to:
reset the transmission configuration information for the UE upon receiving normal-temperature indication information sent by the UE, wherein a data transmission rate corresponding to the reset transmission configuration information is higher than a data transmission rate corresponding to the transmission configuration information of the UE when receiving the normal-temperature indication information sent by the UE.

13. The base station according to claim 9, wherein the processor is further configured to:
send an S1 Setup Request message to the MME when the destination base station establishes a connection with the MME, wherein the S1 Setup Request message carries an indication identifier, which is configured to indicate that the destination base station may reduce the temperature of the UE by setting the transmission configuration information for the UE; and
receive an S1 Setup Response message sent by the MME.

14. User equipment (UE) implementing the method of claim 6, comprising a processor, and memory storing at least one instruction, at least one program, a code set, or an instruction set for execution by the processor to perform operations of the method.

15. The user equipment according to claim 14, wherein the processor is further configured to:
send normal-temperature indication information to the destination base station upon detecting that the temperature of the UE is lower than the preset value.

16. The user equipment according to claim 15, wherein the processor is further configured to:
send normal-temperature indication information to the destination base station upon detecting that the temperature of the UE is lower than the preset value for a preset duration.

17. A system for base station handover comprising the destination base station of claim 11, further comprising a source base station, and the UE, wherein
the source base station comprises a processor and a memory, wherein the memory stores at least one instruction, at least one program, a code set, or an instruction set, wherein the at least one instruction, the at least one program, the code set or the instruction set is loaded and executed by the processor, the processor is configured to:
receive a measurement report sent by the UE and UE excessively high-temperature indication information;

determine a destination base station for the base station handover of the UE based on the measurement report;

send a Handover Require message to a mobility management entity (MME), to which the source base station is connected, via an S1 interface, so that the MME sends a Handover Request message to the destination base station, wherein both the Handover Require message and the Handover Request message carry the UE excessively high-temperature indication information, and send a radio resource control (RRC) connection reconfiguration message to the UE upon receiving a Handover Command message sent by the MME via the S1 interface;

the user equipment comprises a processor and a memory, wherein the memory stores at least one instruction, at least one program, a code set, or an instruction set, wherein the at least one instruction, the at least one program, the code set or the instruction set is loaded and executed by the processor, the processor is configured to:

send a measurement report and UE excessively high-temperature indication information to a connected source base station upon detecting that a base station handover condition is met, when the temperature of the UE is less than a preset value; and receive a radio resource control (RRC) connection reconfiguration message sent by the source base station, so that the destination base station sets transmission configuration information.

18. A communication system implementing the method of claim 1, comprising the source base station, the destination base station, and the UE comprising a central processing unit (CPU), wherein in a case that the UE undergoes base station handover at the excessively high temperature, the destination base station is configured to reduce operating load of the CPU of the UE by setting the transmission configuration information of the UE, thereby reducing the temperature of the UE and reducing probability of service interruption.

* * * * *